Patented Oct. 24, 1939

2,177,250

UNITED STATES PATENT OFFICE 2,177,250

PROCESS FOR PRODUCING BLENDED PIGMENTS

Marion L. Hanahan, Wilmington, and Rodolphe A. Gagnon, Christiana, Del., assignors to E. I. du Pont de Nemours & Company, Wilmington, Del., a corporation of Delaware No Drawing. Application May 27, 1937, Serial No. 145,044

6 Claims. (Cl. 134—58)

This invention relates to the production of composite pigments, and has particular reference to the production of titanium oxide-calcium sulfate extended pigments, of very fine particle size and improved and superior over blends heretofore obtainable.

More specifically, the invention contemplates the direct production of composite pigments by admixing a titanium pigment such as titanium oxide with calcium sulfate containing less combined water than corresponds to the dihydrate, and concurrent with hydration of said calcium sulfate, subjecting the mixture to relatively high shearing forces.

In the concurrently filed application of Winfield W. Heckert, Serial No. 145,051, filed May 27, 1937, there is described a process for manufacturing fine particle size calcium sulfate in which hydration of calcium sulfate is had during its concurrent subjection to relatively high shearing forces, and in the presence or absence of crystal growth restraining agents.

We have discovered that if the hydration process of Heckert is conducted in the presence of a water suspension of calcined or uncalcined titanium pigment, such as titanium oxide, a highly improved, composite calcium sulfate-titanium oxide pigment directly results, said pigment being unusually fine in particle size, greatly improved in texture and tinting strength, and superior to composite pigments produced as a result of mere blending of a titanium pigment with previously hydrated calcium sulfate.

Additionally, we have found that not only may the direct production of an improved blended pigment be thus had, but the pigments so obtained will be entirely free from grit, as well as other objectionable impurities.

Our discovery also embraces the knowledge that the presence of a titanium pigment such as titanium oxide during hydration of the calcium sulfate is very desirous and advantageous. The titanium oxide appears to restrain the crystal growth or particle size increase of the hydrate particles of calcium sulfate which are formed, thus obviating necessity of resort to usual restraining agents for the purpose of retarding or inhibiting particle size growth of the initially formed crystals. Furthermore, the presence of the titanium pigment during hydration pronouncedly influences the ultimate size of the hydrated product which is obtained, such product being finer and further reduced in particle size than is otherwise the case. This influence or restraint which the presence of the titanium pigment appears to exert is in all probability due, we believe, to a chemical influence, although it would appear that the fine primary particles of titanium oxide are also adsorbed on the surface of the initially-formed and very fine sulfate crystals, thus protecting and inhibiting them against further growth.

In one practical adaptation of our invention, a mixture of calcium sulfate hemihydrate or soluble anhydrite and titanium oxide is first made up, said mixture being in any desired proportions by weight. This mixture is charged into a suitable milling apparatus, preferably a Banbury mixer, adapted to subject the same, while in a relatively viscous state, to vigorous agitation or kneading. Concurrently with the charge of the mix into the kneader (or subsequently, if desired) water is added, preferably as rapidly as possible and in amounts sufficient to reduce the mass to a relatively soft, plastic or viscous state, whereby on completion of kneading, said mass remains in paste-like or thickened consistency. For the purpose we have found that an amount of water equalling substantially from 3–7 times the weight of the total mixed solids usually suffices, such ratio being also sufficient to maintain the mass at substantially paste-like consistency throughout the 30 minutes of kneading treatment which we contemplate. On completion of water addition, mechanical movement of the mixer is commenced, being permitted to continue until hydration becomes complete. This usually occurs within from 10–20 minutes of kneading, but kneading is preferably continued for at least 30 minutes, at the end of which time mechanical movement is interrupted. The slurry mass is then removed with a minimum of delay from the kneader and subjected to sufficient heat treatment to effect desired drying or calcination of the resultant product. Any conventional and suitable temperature for effecting either drying or calcination may be resorted to, such as, for instance, less than substantially 200° C. to effect drying or 200° C. or higher to effect calcination. Calcination may also be effected at temperatures ranging to as high as 650–980° C.

Alternatively, the slurry mass prior to discharge from the kneader may be further thinned with water, filtered and then subjected to desired heat treatment to effect dehydration. However, whatever the subsequent treatment, the mass is discharged from the kneader preferably as soon and as rapidly as possible, in order that objectionable crystal growth of the fine particles of calcium sulfate obtained may not occur by reason of continued and prolonged water contact. If the total time consumed in removal of the slurry from the kneader to commencement of heat treatment amounts to no more than substantially 30 minutes of time, avoidance of deleterious crystal growth or particle size increase will be found to exist.

In order that the invention may be more clearly understood, the following specific examples are given, each of which is merely illustrative in character and in no wise in limitation of our invention:

Example I 30 parts by weight of titanium oxide pigment and 214 parts by weight of calcium sulfate hemihydrate were charged into a mixer of the kneader type. 200 parts by weight of water were then admitted and the mixer was operated for approximately 30 minutes at room temperature. At the end of this period the product had a thick pasty consistency. Part of the product was transferred directly to a drying oven while the remainder was slurried to thin paste, facilitating removal from the mixer and was filtered and dried. After drying at about 65° C., the resultant blended pigment exhibited excellent fine texture and examination disclosed that the average particle size of the gypsum constitutent thereof was about 2 microns.

Example II 155 parts by weight of calcium sulfate hemihydrate, 66 parts by weight of pigment $TiO_2$, and 868 parts by weight of water were introduced into a ball mill half full of pebbles and the mill rotated for 15 minutes, after which time the calcium sulfate was completely hydrated to gysum. During this operation it was noted that the thick consistency, stiff, pasty hydrating mass was subjected essentially to shearing forces, the consistency being such that the pebbles did not move freely through said mass. The mass was removed from the ball mill, filtered, washed, dried and calcined. The removal of the mass from the ball mill and initiation of the drying operation was effected with minimum delay. The total time elapsed from completion of hydration to initiation of drying was 30 minutes. After calcination the calcium sulfate admixed with $TiO_2$ consisted practically wholly of non-acicular, insoluble anhydrite with an average particle size of about 1 micron.

Example III

Ground natural gypsum of good quality, especially with respect to color, was dehydrated at 160° C. to 200° C. to a moisture content (combined water) of less than 6%. 210 parts by weight of the dehydrated calcium sulfate were then charged into a kneader mixer and mixed with a slurry consisting of 90 parts by weight of raw $TiO_2$ and 650 parts by weight of water. Kneading was continued for 7 minutes. An additional 400 parts by weight of water were then added and kneading was continued for 15 minutes more. The composite pigment was filtered, washed and calcined. The total time elapsed from the start of the blending operation until drying or calcination was initiated was less than one hour. The calcination temperature was substantially 950° C. The calcined product contained 30.8% $TiO_2$, the remainder comprised calcium sulfate in the insoluble anhydrite form. Said anhydrite was completely non-acicular in character and average 1 micron in particle size. The finished composite pigment was of excellent fine texture and high tinting strength while other pigment properties were normal and satisfactory.

Example IV

Gypsum precipitated from milk of lime and sulphuric acid and consisting largely of characteristic acicular, relatively large particles was dehydrated at about 140° C to 160° C. to a combined water content of less than 4%. 400 parts by weight of this dried dehydrated product were charged into a kneader type mixer and mixed dry with 1540 parts of pigment titanium dioxide prepared in accordance with the process described by Hanahan in U. S. Patent 2,044,941. While continuing to operate the kneading apparatus, 7300 parts by weight of water were introduced. Kneading was continued for 25 minutes, at the end of which time the calcium sulfate was entirely in the form of gypsum and the contents of the kneader were in the form of a thick mass. Additional water was introduced into the kneader and operation continued for a minute or two. The mobile mass was then filtered rapidly and subjected to drying and to calcination. A total time of less than 30 minutes elapsed from completion of the hydration process to initiation of drying or calcination. When dried at temperatures of about 65° C. or less, the pigment obtained comprised $TiO_2$ and gypsum. The average particle size of said gypsum was 1 to 3 microns. When said composite pigment resulting from the above hydration process was calcined at 600° C. to 950° C. the resulting pigment comprised $TiO_2$ and insoluble anhydrite. The latter was present in non-acicular, substantially equidimensional particles averaging about 1 micron in diameter.

The blended composite pigment obtained as a result of our invention will be unusually small in particle size and characteristically uniform and fine in texture. Due to its method of manufacture, it will contain no grit or other objectionable impurities, and will exhibit improved and superior tinting strength over blends obtained by the employment of previously hydrated calcium sulfate.

The composite pigment, if dried at relatively low temperatures, say, of the order of 65° C. or less, will retain its calcium sulfate constituent in the form of very fine particle size gypsum The average particle size of said gypsum will be from 1-3 microns, whereas if said gypsum is prepared in an identical manner and in the absence of the titanium oxide, the particles thereof would average in excess of 3 microns and range as high as 7 microns. While drying of the product at relatively low temperatures affords the obtainment of a composite titanium oxide-gypsum pigment, drying at higher temperatures will prove beneficial, since the gypsum crystals spontaneously disintegrate to very fine, non-acicular state, such disintegration becoming complete when calcination temperatures in excess of substantially 200° C. and within 600-950° C. are resorted to. The calcium sulfate constituent of the calcined composite pigment will be in the form of insoluble anhydrite, and comprise substantially equidimensional particles averaging about 1 micron in diameter or less.

While specific ratios of water to total solids in the hydrating mixture have been set out hereinabove to induce desired consistency of mass for subjection to shearing treatment, these ratios are merely illustrative. The optimum ratio of water to solids will usually be best determined by trial and depend somewhat upon the specific type of starting materials employed, such as soluble anhydrite or hemihydrate, or mixtures of the same, as well as the type of milling apparatus utilized. Generally, if the ratio of water to total solids present in the mixture is sufficient to provide a slurry mass ranging in consistency from a substantially creamy to a heavy, dough-like state, such ratio will be found satisfactory for use in the invention. Accordingly, if the ratio of water to total solids is such that after substantially 30 minutes of milling as a batch process, the reaction mixture is still doughy or viscous in consistency, such ratio will likewise be suitable. As has been indicated, we have found and therefore preferably employ an amount of water equal to substantially 3-7 times the weight of the total solids present in the mixture under treatment, although in the majority of instances a ratio of from 5-7 times as much water as mixed solids will suffice to obtain optimum benefits when employing a kneader type of mixer.

As has also been indicated, the amount of water to be employed for obtaining desired mass consistency will also depend upon the type of milling apparatus utilized. While we have described our invention in its particular and preferred adaptation to a kneader type of mixer provided with blades which function to apply our preferred cutting away or shearing action upon the viscous mass under treatment, it is to be understood other types of mixing apparatus may be utilized, provided the particular type is capable of exerting desired high shearing force action upon the viscous mass being subjected to mixing treatment. For instance, other types of apparatus utilizable include a ball mill, a pebble mill, or a pug mill. Where our preferred kneader apparatus is employed, resort to thicker mass consistencies will be found desirable, whereas in instances when apparatus such as a ball mill is utilized, somewhat thinner mass consistencies, even to an extent approximating a somewhat liquid condition, may be utilized. If the consistency of the mass under treatment is too heavy, it will be found in the instance of a ball mill that free movement of the balls will be prevented. The action which a ball mill exerts is essentially one of grinding or attrition, which, we have found, standing alone is not conducive to the obtainment of optimum benefits under the invention, i. e., effecting hydration of the calcium sulfate and production of a blended pigment under such conditions that excessive crystal growth formation of the calcium sulfate is completely prevented. Therefore, in instances where a ball mill type of apparatus is utilized, and in order to obtain optimum benefits under the invention, care should be taken to maintain the mass under treatment at such consistency as to afford mixing of the mass by a predominantly shearing action with only incidental grinding.

As an alternative operation in carrying the invention into effect, the slurry mass prior to discharge from the milling apparatus may be further thinned with water, filtered, and then subjected to the desired heat treatment. Whatever the subsequent treatment, however, the mass is preferably discharged from the apparatus with a minimum of delay in order to avoid continued contact of the fine particles of calcium sulfate obtained, since continued contact of the fine particles with water would induce objectionable crystal growth. Such crystal growth or particle size increase may be effectively prevented if removal and discharge of the slurry from the milling apparatus is accomplished within a time period not to exceed substantially 30 minutes. Therefore, if the time consumed from commencement of removal of the slurry from the apparatus to commencement of the drying operation does not exceed more than substantially 30 minutes, it will be found that deleterious particle size growth or increase of the calcium sulfate will be effectively prevented.

Although natural gypsum is utilizable in the invention as a starting material, we preferably employ in the process precipitated gypsum obtained, for instance, as a result of reacting milk of lime and sulfuric acid. This precipitated product may be then dehydrated to at least the extent represented by the composition of the hemihydrate, and preferably to such extent that it will contain less than substantially 5% of chemically combined water. Dehydration of precipitated gypsum should be effected at temperatures less than substantially 200° C., and preferably at less than substantially 180° C.

While our process is applicable to the use of uncalcined titanium oxide for blending with calcium sulfate during hydration of the latter, we preferably employ titanium oxide in which the pigmenting properties have already been developed, as for instance, by previous calcination treatment.

Likewise, while our invention has been described in particular reference to the production of a composite titanium oxide-calcium sulfate, pigment, the production of other types of composite pigments containing calcium sulfate and other titanium pigments is also contemplated. Thus, for instance, it is contemplated to produce composite blends of calcium sulfate with all other types of titanium pigments, including the white, insoluble titanates such as calcium, barium, magnesium, zinc-titanates, etc., as well as composite blends containing titanium pigments already extended to some extent with an extender such as barium sulfate, or with natural extenders, such as magnesium silicate, calcium carbonate, etc. Accordingly, the term "titanium pigments", as here employed and in the appended claims, embraces all such types of composite pigments.

In producing the composite pigments of our invention, it will be obvious that any desired proportion or ratio of titanium pigment to calcium sulfate may be utilized. Preferably, however, and in order to produce a completely satisfactory commercial composite pigment, we employ a range of titanium content such as titanium oxide of from 15%-60% in the blended pigment.

While we have described our invention in its particular adaptability to a batch process, it is obvious that the same has equal application for use in continuous or semi-continuous processes.

We claim as our invention:

1. A process for producing a blended pigment, comprising subjecting calcium sulfate containing less combined water than the dihydrate to hydration in the presence of a water suspension of a titanium pigment, concurrently therewith subjecting the mixture to mechanical shearing action treatment and upon effecting said calcium sulfate hydration and within substantially 30 minutes from completion of said mechanical shearing treatment, dehydrating the resultant product.

2. A process for producing a blended calcium sulfate-titanium oxide pigment, comprising hydrating calcium sulfate containing less combined water than the dihydrate in the presence of a water suspension of titanium oxide, during said hydration and while said mixture is in a substantially paste-like state, subjecting the same to shearing mechanical treatment and upon effecting said calcium sulfate hydration and within substantially 30 minutes from said mechanical shearing treatment, dehydrating the resultant product.

3. A process for producing a blended calcium sulfate-titanium oxide pigment, comprising subjecting calcium sulfate containing less combined water than the dihydrate to hydration in the presence of a titanium-containing pigment, maintaining the hydrating mixture in a relatively viscous state, during and until completion of said hydration subjecting said mixture to mechanical shearing action, and subsequently calcining the resultant product within substantially 30 minutes from completion of said mechanical treatment.

4. A process for directly producing a blended pigment, comprising mixing calcium sulfate containing less combined water than a dihydrate, a titanium pigment and water, the water being present in amount sufficient to maintain the resultant mixture in a substantially paste-like and thickened consistency, during and until completion of hydration of said calcium sulfate subjecting the mixture to mechanical shearing action, and thereafter dehydrating the resultant product within substantially 30 minutes from completion of said mechanical treatment.

5. A process for directly producing a blended calcium sulfate-titanium oxide pigment during concurrent hydration of said calcium sulfate, comprising mixing a calcium sulfate hemihydrate, titanium oxide and water, the latter ranging in amount from substantially 3–7 times the weight of total solids present in the mixture, during and until completion of hydration subjecting the mixture to mechanical treatment involving shearing forces until completion of hydration of said calcium sulfate is effected, and within substantially 30 minutes from completion of said mechanical treatment subjecting the resultant blended product to dehydration.

6. A process for directly producing a blended calcium sulfate-titanium oxide pigment during hydration of said calcium sulfate, comprising mixing calcium sulfate hemihydrate, titanium oxide and water, said water being in amount ranging from substantially 3–7 times the weight of total solids present in the mixture, during and until completion of hydration of said hemihydrate subjecting the mixture while in a relatively viscous state to mechanical kneading, and drying and recovering the resultant composite pigment within substantially 30 minutes from completion of said mechanical kneading.

MARION L. HANAHAN.
RODOLPHE A. GAGNON.